United States Patent
Anand et al.

(10) Patent No.: US 8,635,673 B2
(45) Date of Patent: Jan. 21, 2014

(54) DYNAMIC APPLICATION ADAPTATION IN SOFTWARE-AS-A-SERVICE PLATFORM

(75) Inventors: Rangachari Anand, Teaneck, NJ (US); Stacy F. Hobson, Poughkeepsie, NY (US); Juhnyoung Lee, Yorktown Heights, NY (US); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/163,177

(22) Filed: Jun. 17, 2011

(65) Prior Publication Data
US 2012/0324539 A1    Dec. 20, 2012

(51) Int. Cl.
G06F 7/04    (2006.01)

(52) U.S. Cl.
USPC ........... 726/4; 726/1; 726/6; 726/27; 713/167

(58) Field of Classification Search
None
See application file for complete search history.

(56) References Cited

U.S. PATENT DOCUMENTS

| | | | |
|---|---|---|---|
| 5,550,971 A | 8/1996 | Brunner et al. | |
| 5,590,326 A | 12/1996 | Manabe | |
| 5,649,102 A | 7/1997 | Yamauchi et al. | |
| 5,872,850 A | 2/1999 | Klein et al. | |
| 6,064,968 A | 5/2000 | Schanz | |
| 6,256,676 B1 | 7/2001 | Taylor et al. | |
| 6,327,594 B1 | 12/2001 | Van Huben et al. | |
| 6,338,088 B1 * | 1/2002 | Waters et al. | 709/226 |
| 6,564,325 B1 * | 5/2003 | Travostino et al. | 726/21 |
| 6,591,265 B1 | 7/2003 | Erickson et al. | |
| 6,738,975 B1 | 5/2004 | Yee et al. | |
| 6,779,184 B1 | 8/2004 | Puri | |
| 7,114,146 B2 | 9/2006 | Zhang et al. | |
| 7,131,057 B1 | 10/2006 | Ferrucci et al. | |
| 7,237,225 B2 | 6/2007 | Kompalli et al. | |
| 7,293,010 B2 | 11/2007 | Angele et al. | |
| 7,305,392 B1 | 12/2007 | Abrams | |
| 7,412,034 B2 * | 8/2008 | Rancu et al. | 379/9 |
| 7,509,326 B2 | 3/2009 | Krabel et al. | |
| 7,571,447 B2 | 8/2009 | Ally et al. | |
| 7,603,300 B2 | 10/2009 | Haffner et al. | |
| 7,617,174 B2 | 11/2009 | Chen et al. | |
| 7,620,980 B1 | 11/2009 | Wood et al. | |
| 7,631,089 B2 | 12/2009 | Knauerhase et al. | |
| 7,725,429 B2 | 5/2010 | Rangadass et al. | |
| 7,895,445 B1 | 2/2011 | Albanese | |

(Continued)

OTHER PUBLICATIONS

Deep Secure, The Deep-Secure Mail Guard Applies Policy Enforcement and Content Checking to Email, Deep Secure Mail Guard Information and Fact Sheet, 2010.

(Continued)

Primary Examiner — Kaveh Abrishamkar
(74) Attorney, Agent, or Firm — Scully, Scott, Murphy & Presser, P.C.; William Stock, Esq.

(57) ABSTRACT

Dynamic application adaptation in software-as-a-service platform, in one aspect, may receive an access permission associated with a published shared data management data object in the software-as-a-service platform having shared data management and a plurality of applications deployed, look up one or more rules associated with one or more features of an application deployed on the software-as-a-service platform, based on the received access permission, and activate or deactivate said one or more features associated with said plurality of applications based on said one or more rules.

22 Claims, 3 Drawing Sheets

(56) References Cited

U.S. PATENT DOCUMENTS

| | | | |
|---|---|---|---|
| 8,271,443 B1* | 9/2012 | Swift et al. | 707/640 |
| 2003/0137539 A1 | 7/2003 | Dees | |
| 2005/0055556 A1 | 3/2005 | Shiu et al. | |
| 2006/0072709 A1* | 4/2006 | Rancu et al. | 379/9.01 |
| 2006/0259923 A1 | 11/2006 | Chiu | |
| 2006/0287890 A1 | 12/2006 | Stead | |
| 2007/0220035 A1 | 9/2007 | Misovski | |
| 2007/0220588 A1 | 9/2007 | Panda et al. | |
| 2007/0239858 A1* | 10/2007 | Banerji et al. | 709/220 |
| 2007/0282748 A1 | 12/2007 | Saint Clair | |
| 2008/0059543 A1 | 3/2008 | Engel | |
| 2008/0256467 A1 | 10/2008 | Chu | |
| 2009/0099852 A1 | 4/2009 | Ouimet | |
| 2010/0030623 A1 | 2/2010 | Guglani | |
| 2010/0122155 A1 | 5/2010 | Monsarrat | |
| 2010/0175112 A1* | 7/2010 | Loeb et al. | 726/4 |
| 2010/0205432 A1* | 8/2010 | Corda et al. | 713/159 |
| 2010/0218167 A1 | 8/2010 | Turner et al. | |
| 2011/0010759 A1 | 1/2011 | Adler | |
| 2011/0025707 A1 | 2/2011 | Fujioka | |
| 2011/0047597 A1 | 2/2011 | Mahaffey | |
| 2011/0078243 A1 | 3/2011 | Carpenter | |
| 2011/0277026 A1* | 11/2011 | Agarwal et al. | 726/8 |
| 2012/0130746 A1* | 5/2012 | Baker | 705/3 |

OTHER PUBLICATIONS

Loser, et al., Master Data Management for Collaborative Service Processes, International Conference on Service Systems and Service Management, Beijing, China, 2004.

Ullman, Information integration using logical views, Theoretical Computer Science—Special issue on the 6th International Conf. on DB Theory—ICDT, vol. 239 Is. May 2, 2000.

Genesereth, et al., Infomaster: an information integration system, SIGMOD '97 Proceedings of the 1997 ACM SIGMOD international conference on Management of data, 1997.

Arens, et al., Query reformulation for dynamic information integration, Journal of Intelligent Information Systems, vol. 6 Issue 2-3, Jun. 1996.

Themistocleous, et al., ERP and application integration: Exploratory survey, AMCIS 2001 proceedings.

Lee, et al., Enterprise integration with ERP and EAI, Communications of the ACM, vol. 46 Issue 2, Feb. 2003.

Zeng, et al., QoS-aware middleware for Web services composition, IEEE Transactions on Software Engineering, vol. 30 Issue 5, May 2004.

Zeng, Quality driven web services composition, WWW '03 Proceedings of the 12th international conference on World Wide Web, 2003.

Milanovic, Current Solutions for Web Service Composition, IEEE Internet Computing, vol. 8 Issue 6, Nov. 2004.

Benatallah, et al., The Self-Sery environment for Web services composition, IEEE Internet Computing, vol. 7 , Issue 1, Jan./Feb. 2003.

Casati, et al., Adaptive and Dynamic Service Composition in eFlow, CAiSE '00 Proceedings of the 12th International Conf. on Advanced Information Systems Engineering, 2000.

Gold, et al., Understanding Service-Oriented Software, IEEE Software, vol. 21 Issue 2, Mar. 2004.

Drummond, et al., A Data Broker for Distributed Computing Environments, ICCS '01 Proceedings of the International Conference on Computational Sciences—Part I, 2001.

Modahl, et al., MediaBroker: An Architecture for Pervasive Computing, PERCOM '04 Proceedings of the 2nd IEEE Intntnl Conf. on Pervasive Computing and Communications, 2004.

Mouhib Alnoukari, Applying Adaptive Software Development (ASD) Agile Modeling on Predictive Data Mining Applications: ASD-DM Methodology, Int. Symposium on Info. Tech., 2008.

Cervantes, et al, A Framework for Constructing Adaptive Component-Based Applications: Concepts and Experiences. 7th Symposium on Computer-Based Software Engineering, 2004.

Gui, et al, An Architectural Based Framework for Managing Adaptive Real-time Applications, 35th Euromicro Conference on Software Engineering and Advanced Applications, 2009.

Mena, et al, A Software Retrieval Service Based on Adaptive Knowledge-Driven Agents for Wireless Environments, ACM Transactions on Autonomous & Adaptive Systems, V.1 1.1 2006.

Jeff Kelly, New Online Marketplace Could Boost Data Integration Applications, DataManagement.com, Feb. 18, 200. http://searchdatamanagement.techtarget.com/news/1389686.

Turner, Turning Software into a Service, Computer, vol. 36 Issue 10, Oct. 2003.

\* cited by examiner

DYNAMIC APPLICATION ADAPTATION IN SOFTWARE-AS-A-SERVICE PLATFORM

FIELD

The present application relates generally to computers and applications, and more particularly to dynamic application adaptation in software-as-a-service platform.

BACKGROUND

In many entities still, in-house IT applications are poorly integrated, for example, with disparate applications running on their own, even when there are commonalities in the data those applications use. In such cases, data updated by one application is usually imported to another application manually. For instance, an IT administrator may have to manually access data updated or used by one application and load on to another application.

Take for example, local or municipal government's IT applications used to support service delivery for the municipalities. Those applications are typically aligned directly to the departmental structure, with application(s) covering only the tasks associated with a single department. However, services offered and provided to citizens often involve the work of many departments. Consider, for example, a parcel that has been recently renovated by its owners. The parcel owner applies for a building permit from the Building department. After the work has been completed and the Certificate of Occupancy has been issued, the Assessor's office must update the parcel details to reflect the renovations and initiate a parcel reassessment. The newly assessed value has to be updated in the tax system for calculation of the property tax liability. Finally, the property tax payments collected by the tax department are directly entered into the tax system, and must later be updated in and reconciled with the accounts of the Finance department's General Ledger. This example describes the complex interactions between four departments as part of the administration for parcel management services including the renovations, assessment and property tax processes.

In many cases, the departments all use distinct, nonintegrated, custom software programs to aid in their work. Additionally, departments may also use paper-based records and manual record-keeping. Municipalities may choose to pay for pair-wise integration between software applications or purchase preintegrated software packages, especially for departments that share information frequently. Departments such as Police and Justice, Assessment and Tax, Personnel and Finance rely heavily on the sharing of information that is central to their work. The Police department must notify the Justice department of arrest and investigation details as input to current and future court cases. The Assessment department must periodically give the Tax department the tax roll, a listing of all taxable parcels, their current assessment values, and valid exemptions. The Personnel department (and/or individual departments) maintains information on employee pay rates, raises, benefits, and work hours. These factors are used to calculate semi-monthly pay to produce payroll checks.

Although municipalities have the choice to pay for integration between independent applications, the cost is usually prohibitive. Additionally, the association of IT applications to a single specific department can be a limiting factor for service offerings. The applications are not flexible to adapt to new needs, therefore the only way currently to have this information reflected in multiple department software is through constant manual transmission and inputting.

BRIEF SUMMARY

A method and a system for dynamic application adaptation in software-as-a-service platform may be provided. The method, in one aspect, may include receiving an access permission associated with a published shared data management data object in the software-as-a-service platform having shared data management and a plurality of applications deployed. The method may also include looking up one or more rules associated with one or more features of an application deployed on the software-as-a-service platform, based on the received access permission. The method may further include activating or deactivating said one or more features associated with said plurality of applications based on said one or more rules.

A system for dynamic application adaptation in software-as-a-service platform, in one aspect, may include a permission adaptation harness module operable to execute on a processor and receive an access permission associated with a published shared data management data object in the software-as-a-service platform having shared data management and a plurality of applications deployed. The permission adaptation harness module may be further operable to look up one or more rules associated with one or more features of an application deployed on the software-as-a-service platform, based on the received access permission, and further activate or deactivate said one or more features associated with said plurality of applications based on said one or more rules.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
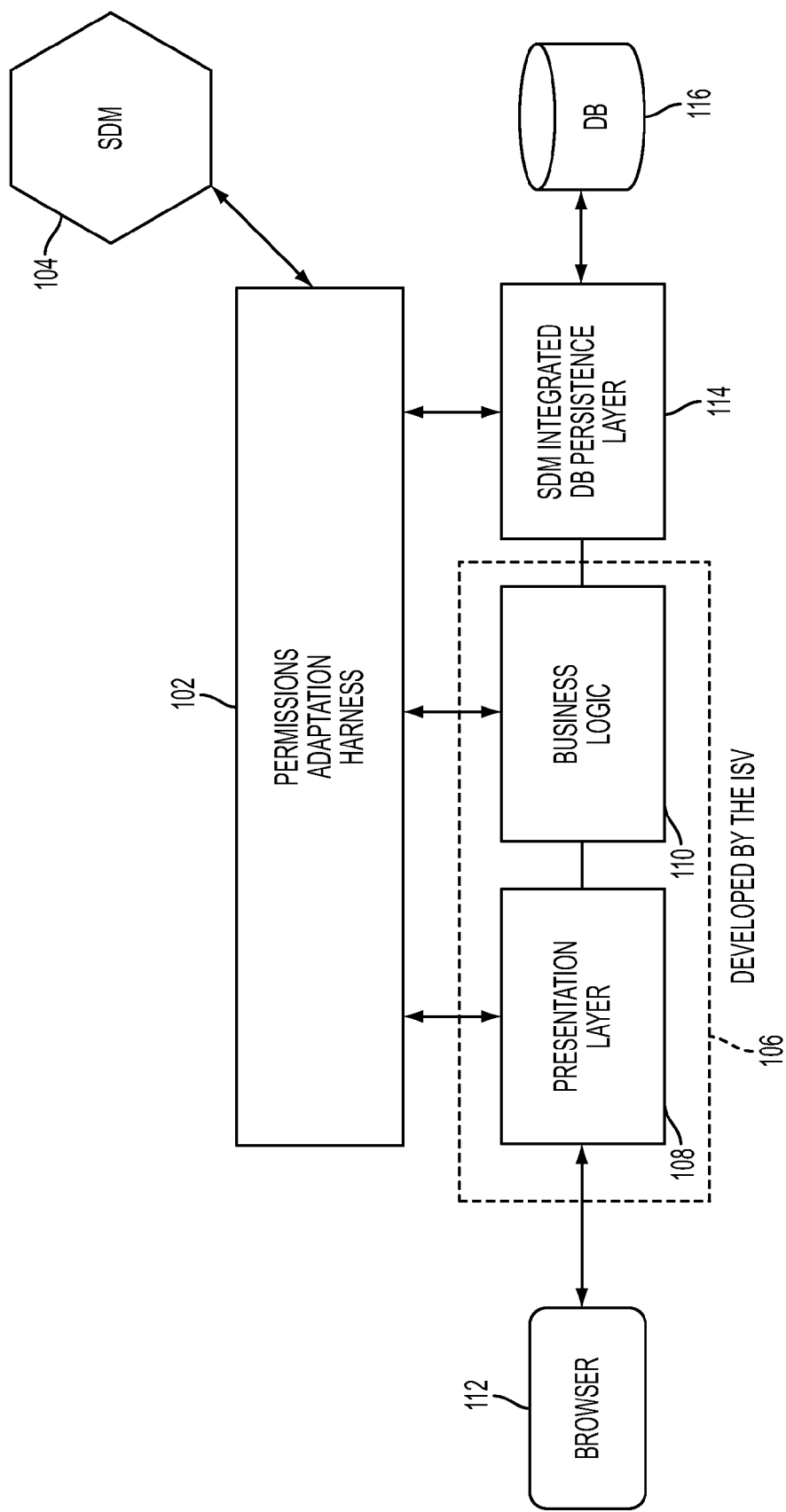
FIG. 1 illustrates components of a system for allowing applications in SaaS platform to dynamically adapt to permission changes in shared data in embodiment of the present disclosure.

Shared data management (SDM) enables platform-mediated data sharing among applications, for example, in Software-as-a-Service platform. Software-as-a-Service or SaaS refers to providing the use of software or application as a service on demand, for instance, by subscription, e.g., in a "pay-as-you-go" model. A customer or a user subscribes for the use of a software application, for instance, as needed by the customer. Typically, an application being provided as a service is resident in a remote platform which a customer may access via a network (e.g., the Internet via a browser or the like interface). The remote platform may include a number of different applications. For instance, a provider of SaaS provides a computing platform and resources for running applications. The applications need not have been developed by the provider, but may have been deployed and set up on the platform by independent software vendors. SDM provides a common database system, a common data object schema or model, and logic or algorithms for enabling those applications to share data. SDM is described in detail in co-owned U.S. patent application Ser. No. 13/051,303 entitled, "Shared Data Management in Software-As-A-Service Platform" and filed on Mar. 18, 2011, which application is incorporated herein by reference in its entirety. SDM may function as a data marketplace or data broker for dynamic data trading, and enable data trade among applications. Data trade herein refers to offers and requests specified by applications. Applications may offer to update data (e.g., shared objects and attributes); Applications may request read access to the data (e.g., shared objects and attributes). Co-owned U.S. patent application Ser. No. 13/163,274 entitled, "Open Data Marketplace for Municipal Services" and filed on Jun. 17, 2011 describes data marketplace, co-owned U.S. patent application Ser. No. 13/163,373 entitled, "Enforcing Data Sharing Policy through Shared Data Management" and filed on Jun. 17, 2011 describes enforcing data sharing. Those applications are incorporated herein by reference in their entirety.

In data trades, applications may offer to update specific attributes of shared objects. In one aspect, update offers are optional. An SDM administrator may accept or reject an update offer. Also in data trades, application may request read access to specific attributes of shared objects. Read requests may be designated by the applications as optional or mandatory. If a mandatory read request is denied, the application may not be able to perform its basic functionality. For example, a tax application may not be able to perform computing a tax amount, if it does not have read access to assed value of a land parcel. An optional read request may be granted or denied by an SMD administrator, for instance, based on business requirements. If an optional read request is denied, the application should continue to operate but may be with reduced functionality. In one embodiment of the present disclosure, applications are enabled to adapt to permission changes gracefully.

Applications may interact with SDM in different modes, e.g., permissions related interactions and data interactions. There may be permissions related interactions in which an application may send data trade (e.g., offers to update data and/or requests to read data) to SDM, e.g., when the application is added to a subscription set, and in which the application may receive notifications of permissions granted or denied. During normal operations of applications, permission related interactions may include sending permission change notifications to the applications in response to an administrator of SDM changing permissions, and the applications receiving the notifications. Data interactions with SDM may occur during normal operations of the applications and may include the applications reading and/or updating data managed by SDM.

Permission changes to data access may potentially affect all parts of applications running on a SaaS platform, such as the presentation layer, program logic and persistence layer. As an example, consider a presentation layer that includes a web page and a field on the page that allows a user to update attribute value of an object. If an update offer for that attribute is not accepted, that web page should be presented to the user with that field disabled. As another example, if a read access request is denied for optional attribute, that attribute should not be displayed on the presentation layer, for instance, on a web page. In addition, program logic that handles the data associated with the denied permission may need to be changed. Further, in persistence layer, database access patterns may have to change based on granted or denied permission. For instance, if an update offer is accepted, an application may continue to update the data also in its own database, but the data should always be read from the SDM. Other applications accessing that data should also read from SDM for data coherency.

FIG. 1 illustrates components of a system for allowing applications in SaaS platform to dynamically adapt to permission changes in shared data. An application 106 deployed on a SaaS platform may include a presentation layer 108 as well as a program or application logic component 110. A presentation layer may include computer (machine) logic or computer (machine) instructions for interacting with a user or client, for instance, via a client user interface such as a browser 112. An example browser 112 includes a web browser. SDM 104 integrated DB (database) persistence layer 114 stores data to application's local database 116. SDM 104 manages shared data among the applications running on SaaS platform. An application running on the SaaS platform, for instance, when the application is started, communicates with SDM 104 and retrieves latest permissions from SDM 104 via permission adaptation harness module or component 102. A permissions adaptation harness module or component 102 may be implemented as a library function that may be linked with the application 106. During normal operations, a permissions adaptation harness component 102 continues to receive permission related update notifications from SDM 104, providing a convenient application programming interface (API) that allows the application 106 to obtain permission information. The permissions adaptation harness component 102 may be tightly integrated with the presentation layer 108 to route data to and from SDM 104 based on permissions. Changes in the presentation layer 108 may be propagated to changes in program logic 106, and also to the persistent layer 114.

In one aspect, SDM permissions may be associated with application features. For example, SDM 104 may manage a parcel object, e.g., a data object having information about a land parcel, which may have attributes pertaining to liens on land parcels. An application may have a functional component or a module having to do with liens, for example, referred to as a lien module. The lien module of the application may be enabled or disabled dynamically based on the application's permission to access the parcel object or its one or more attributes managed by SDM 104. In one embodiment of the present disclosure, the permission adaptation harness module 102 may be made aware of attribute bundles (data objects and one or more of attributes of the data objects) associated with the features or functional modules of the application. In one aspect, rules or the like specification may associate granted permissions with enabling of the features in the application. Rules may be specified in formats such as extended markup language (XML), database table, and/or others. The permission adaptation harness module 102 may activate or deactivate application features based on grated permissions from SDM 104 dynamically.

In another aspect, users may perform what-if scenarios, for instance to determine or visualize how an application may behave differently based on different permission scenarios. Different what-if scenarios may be tested, for instance, by changing the rules and/or permissions.

Figure 2:
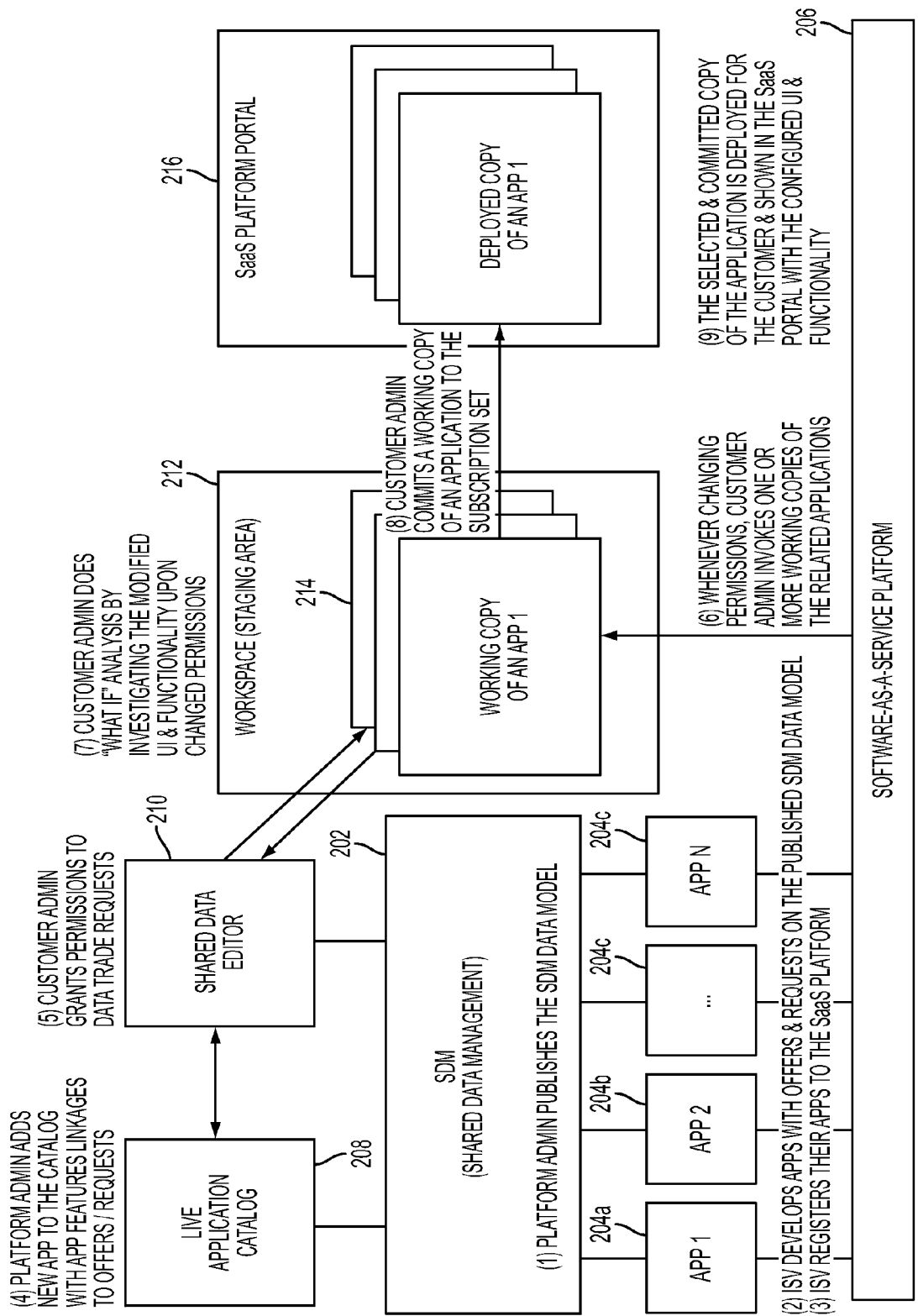
FIG. 2 is a diagram illustrating system components of present disclosure in another aspect.

FIG. 2 is a diagram illustrating system components of present disclosure in another aspect.

A SaaS platform administrator may publish the SDM data model managed. The data model includes data objects and their attributes managed in SDM 202. Applications 204a, 204b, 204c, 204n developed with offers and requests on the published SDM data model may be registered to the SaaS platform 206. In addition, the SaaS platform administrator may add new applications to a catalog of applications 208 on the SaaS platform 206. The catalog of applications 208 may include a list of applications that are registered to the SaaS platform. When an application is registered to a SaaS platform, it shows up in the application catalog or service catalog 208. The end users of the SaaS platform browse the catalog and subscribe one or more applications from the catalog. The subscribed applications will show up in the end user's subscription set. A portal 216 shows various services available in the SaaS platform—including (1) the application catalog so that a user can browse available services in the platform and subscribe one or more; (2) the subscribed application set of the user; (3) the user interface of each of the subscribed application; (4) the account page or administrative page where the user can edit the account information and/or other information; (5) the customer service page; and (6) other service pages. The services and pages displayed in the portal may differ from one user to another, depending on their roles, e.g., end-user or administrator. For example, the end-user will not see the SDM editor, which is used by the administrator to grant or deny permissions for offers and requests.

Administrators of systems that own the data published in the data model may grant or deny permissions to data trade requests, for instance, via a shared data editor 210. A workspace staging area 212 may be provided in which the administrator when changing permissions, may invoke one or more working copies of the applications 214 that may be affected by the changed permissions. The working copies of applications are applications (app 1, . . . , app N), but with the current data trade permission setting. The administrator makes changes to the permission setting in the Shared Data Editor. However the administrator does not fully see in the editor how the changes affect the applications, for instance, in their presentation layer, business logic, and persistence logic. Before making the changes permanent, the administrator may deploy the applications in the working staging area which is not shown to the end-users, and review the effect of the changes in the applications. Once the administrator confirms that the applications are working properly with the permission changes, the administrator may make the changes permanent and the applications may be deployed to the portal 216 which is viewed by the end-users. Using the workspace staging area 212, the administrator may perform "what-if" analysis by investigating the modified presentation layer (e.g., user interface) and functionality upon changed permissions. The workspace or staging area 212 is a temporary place where applications and other services are shown; all the services work as if they are functioning in the portal. The difference is that the staging area is shown only to the administrator, but not to the end-users; the end-users do not usually recognize the existence of the staging area.

From the results of the what-if analysis performed in the workspace stage area 212, the administrator may select and commit a working copy of an application to a subscription set in a SaaS platform portal 214. The selected and committed copy of an application is deployed for a customer and shown in the SaaS portal 214 with the configured presentation layer and functionality.

Figure 3:
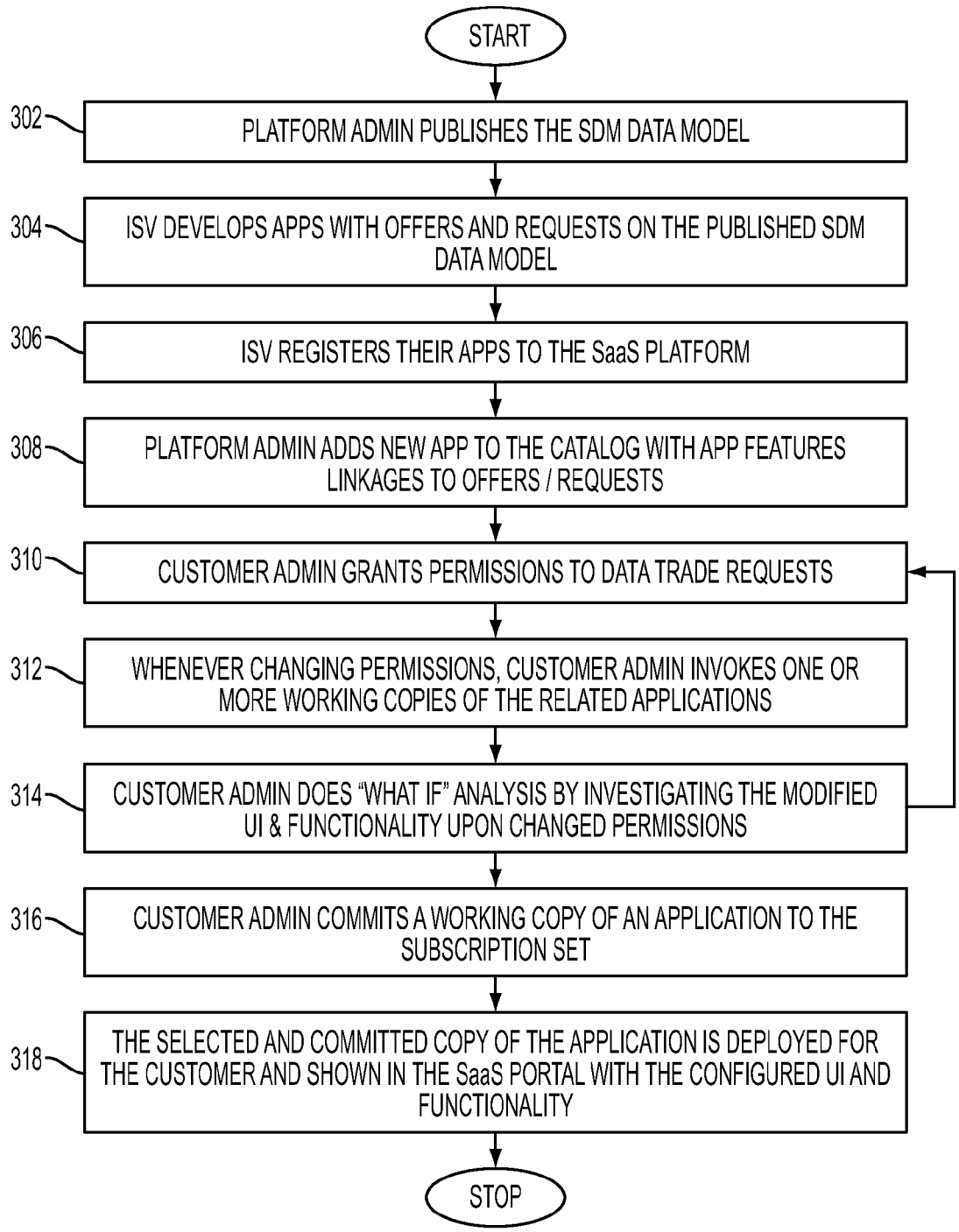
FIG. 3 is a flow diagram illustrating dynamic application adaptation in one embodiment of the present disclosure.

FIG. 3 is a flow diagram illustrating dynamic application adaptation in one embodiment of present disclosure. At 302, a SaaS platform administrator may publish the SDM data model. The data model may describe data structures of the objects managed by the SDM, for instance, their attributes and types. At 304, applications may be developed with offers and requests on the published SDM data model. At 306, the applications may be registered to the SaaS platform. At 308, a SaaS platform administrator may add new applications to a catalog of applications on the SaaS platform. At 310, a customer administrator may grant permissions to data trade requests.

In one embodiment of the present disclosure, a SaaS platform provides a "shared services". It provides "multi-tenancy" capability. Multiple tenants can share the SaaS platform, and its hardware infrastructure and applications deployed on the platform, without recognizing the existence of other tenants because the platform provides a level of "isolation". In an example of a SaaS platform for the municipal governments, a SaaS platform set up for a state of New York can be shared by multiple municipalities, i.e., tenants, e.g., town of New Castle, city of Cohoes, village of Mamaroneck, county of Westchester, etc. There is one "SaaS platform administrator" for the entire platform. This system administrator manages the applications registered to the platform and enlists them in the application/service catalog of the platform. In addition, each tenant has one administrator, referred to as a "customer administrator", or an "SDM administrator". In this setup, each tenant has an SDM setting. There may be only one physical SDM system, but it can be logically shared by multiple tenants. Each tenant has a different "application subscription set" and so data trade permission setting. An SDM administrator (also referred to as a customer administrator) for each tenant may make changes to the data trade permissions in the Shared Data Editor.

At 312, whenever changing permission, a customer administrator may invoke one or more working copies of the applications that may be affected by the changed permissions. At 314, a customer administrator may perform "what-if" analysis by investigating the modified presentation layer (e.g., user interface) and functionality upon changed permissions. The steps 312 to 314 may be repeated with different permissions.

At 316, a customer administrator may select and commit a working copy of an application to the subscription set. An application catalog shows all or subsets of applications registered to a SaaS platform and accepted by its administrator. A subscription set is a collection of applications from the catalog subscribed by a tenant in the platform. A SDM administrator or customer administrator or tenant administrator sees the subscription set of the administrator's municipality in the Shared Data Editor, and manages the data trade permission setting among the applications in the administrator's subscription set.

At 318, the selected and committed copy of the application is deployed for a customer and shown in the SaaS portal with the configure user interface and functionality. The configure user interface and functionality include the application presentation layer and/or program logic adapted to the permission change.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for dynamic application adaptation in software-as-a-service platform, comprising:
   receiving an access permission associated with a published shared data management data object in the software-as-a-service platform having shared data management managing a plurality of data objects and a plurality of applications deployed, the plurality of applications sharing the plurality of data objects;
   looking up one or more rules associated with one or more features of an application deployed on the software-as-a-service platform, based on the received access permission to the published shared data management data object; and
   activating or deactivating said one or more features associated with said plurality of applications based on said one or more rules, the one or more rules comprising one or more of disabling a presentation layer's input field, not displaying an attribute of the published shared data management data object by a presentation layer, or changing persistence layer's database access patterns of the persistence layer's own database.

2. The method of claim 1, wherein the receiving an access permission step includes receiving notification that the access permission has changed, and the activating or deactivating step includes dynamically activating or deactivating said one or more features based on said change in permission.

3. The method of claim 1, wherein said one or more features are associated with one or more of presentation layer or program logic layer or persistence layer of the application, or combinations thereof.

4. The method of claim 1, wherein the receiving an access permission step includes continually checking the shared data management for changes in the access permission.

5. The method of claim 1, wherein the access permission is changed as a result of one or more applications being removed from the plurality of applications deployed on the software-as-a-service platform.

6. The method of claim 1, further including:
   testing the activated or deactivated one or more features on a workspace.

7. The method of claim 6, further including:
   deploying said application with the tested activated or deactivated one or more features on a portal of the software-as-a-service platform.

8. A system for dynamic application adaptation in software-as-a-service platform, comprising:
   a processor;
   a permission adaptation harness module operable to execute on the processor and receive an access permission associated with a published shared data management data object in the software-as-a-service platform having shared data management managing a plurality of data objects and a plurality of applications deployed, the plurality of applications sharing the plurality of data objects the permission adaptation harness module further operable to look up one or more rules associated with one or more features of an application deployed on the software-as-a-service platform, based on the received access permission to the published shared data management data object, and further activate or deactivate said one or more features associated with said plurality of applications based on said one or more rules, the one or more rules comprising one or more of disabling a presentation layer's input field, not displaying an attribute of the published shared data management data object by a presentation layer, or changing persistence layer's database access patterns of the persistence layer's own database.

9. The system of claim 8, wherein the permission adaptation harness module is operable to receive notification that the access permission has changed, and in response dynamically activates or deactivates said one or more features based on said change in permission.

10. The system of claim 8, wherein said one or more features are associated with one or more of presentation layer or program logic layer or persistence layer of the application, or combinations thereof.

11. The system of claim 8, wherein the permission adaptation harness module continually checks the shared data management for changes in the access permission.

12. The system of claim 8, wherein the access permission is changed as a result of one or more applications being removed from the plurality of applications deployed on the software-as-a-service platform.

13. The system of claim 8, wherein the permission adaptation harness module is provided as a library function to which said plurality of applications can link.

14. The system of claim 8, further including:
a workspace for testing the activated or deactivated one or more features.

15. The system of claim 14, further including:
a portal associated with the software-as-a-service platform for deploying said application with the tested activated or deactivated one or more features.

16. A computer readable storage medium, excluding a signal per se, storing a program of instructions executable by a machine to perform a method of for dynamic application adaptation in software-as-a-service platform, comprising:

receiving an access permission associated with a published shared data management data object in the software-as-a-service platform having shared data management managing a plurality of data objects and a plurality of applications deployed, the plurality of applications sharing the plurality of data objects;

looking up one or more rules associated with one or more features of an application deployed on the software-as-a-service platform, based on the received access permission to the published shared data management data object; and activating or deactivating said one or more features associated with said plurality of applications based on said one or more rules, the one or more rules comprising one or more of disabling a presentation layer's input field, not displaying an attribute of the published shared data management data object by a presentation layer, or changing persistence layer's database access patterns of the persistence layer's own database.

17. The computer readable storage medium of claim 16, wherein the receiving an access permission step includes receiving notification that the access permission has changed, and the activating or deactivating step includes dynamically activating or deactivating said one or more features based on said change in permission.

18. The computer readable storage medium of claim 16, wherein said one or more features are associated with one or more of presentation layer or program logic layer or persistence layer of the application, or combinations thereof.

19. The computer readable storage medium of claim 16, wherein the receiving an access permission step includes continually checking the shared data management for changes in the access permission.

20. The computer readable storage medium of claim 16, wherein the access permission is changed as a result of one or more applications being removed from the plurality of applications deployed on the software-as-a-service platform.

21. The computer readable storage medium of claim 16, further including:
testing the activated or deactivated one or more features on a workspace.

22. The computer readable storage medium of claim 21, further including:
deploying said application with the tested activated or deactivated one or more features on a portal of the software-as-a-service platform.

* * * * *